(12) United States Patent
Gu et al.

(10) Patent No.: US 9,137,530 B2
(45) Date of Patent: Sep. 15, 2015

(54) VIDEO COMMUNICATION METHOD AND SYSTEM FOR DYNAMICALLY MODIFYING VIDEO ENCODING

(71) Applicant: TENCENT TECHNOLOGY (SHENZHEN) COMPANY LIMITED, Shenzhen (CN)

(72) Inventors: Chenchen Gu, Shenzhen (CN); Qian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 66 days.

(21) Appl. No.: 13/933,761

(22) Filed: Jul. 2, 2013

(65) Prior Publication Data

US 2013/0293668 A1    Nov. 7, 2013

Related U.S. Application Data

(63) Continuation of application No. PCT/CN2011/083439, filed on Dec. 5, 2011.

(30) Foreign Application Priority Data

Jan. 5, 2011 (CN) .......................... 2011 1 0001383

(51) Int. Cl.
*H04N 7/14* (2006.01)
*H04N 19/164* (2014.01)
(Continued)

(52) U.S. Cl.
CPC ......... *H04N 19/00236* (2013.01); *H04N 7/147* (2013.01); *H04N 19/164* (2014.11);
(Continued)

(58) Field of Classification Search
CPC .................................................. H04N 7/17363
USPC ....................................... 348/14.13; 709/204
See application file for complete search history.

(56) References Cited

U.S. PATENT DOCUMENTS 5,559,946 A * 9/1996 Porter ........................... 715/781
5,689,800 A * 11/1997 Downs .......................... 725/114
(Continued)

FOREIGN PATENT DOCUMENTS

| CN | 1599453 A | 3/2005 |
|---|---|---|
| CN | 1906949 A | 1/2007 |
| CN | 1969558 A | 5/2007 |

OTHER PUBLICATIONS

International Search Report mailed Mar. 15, 2012 in corresponding International Application No. PCT/CN2011/083439.

*Primary Examiner* — Creighton Smith
(74) *Attorney, Agent, or Firm* — Staas & Halsey LLP

(57) ABSTRACT

The present invention relates to a video communication method for dynamically modifying video encoding, which includes: obtaining a video window size change signal in a video receiver; generating an encoding modification signal according to the change signal; transmitting the encoding modification signal to a video sender; the video sender receiving the modification signal and modifying encoding parameters of a encoder in real time according to the modification signal. The present invention also relates to a video communication system for dynamically modifying video encoding. Once video window size changes, the video receiver immediately sends a signal to the video sender to inform the video sender to modify encoding parameters. The video sender modifies the encoding parameters according to the signal, and adaptively modifies bandwidth and CPU requirement of each channel according to the RTCP feedback.

15 Claims, 7 Drawing Sheets

(51) Int. Cl.
*H04N 21/2343* (2011.01)
*H04N 21/443* (2011.01)
*H04N 21/6587* (2011.01)
*H04N 21/485* (2011.01)
*H04N 21/6379* (2011.01)

(52) U.S. Cl.
CPC .......... *H04N21/234354* (2013.01); *H04N 21/234363* (2013.01); *H04N 21/234381* (2013.01); *H04N 21/4438* (2013.01); *H04N 21/4858* (2013.01); *H04N 21/6379* (2013.01); *H04N 21/6587* (2013.01)

(56) References Cited

U.S. PATENT DOCUMENTS

| | | | | |
|---|---|---|---|---|
| 6,212,232 | B1* | 4/2001 | Reed et al. | 375/240.03 |
| 6,577,324 | B1* | 6/2003 | Palmer et al. | 715/705 |
| 6,643,710 | B1* | 11/2003 | Thorne et al. | 709/250 |
| 6,654,825 | B2* | 11/2003 | Clapp et al. | 710/60 |
| 8,718,137 | B2* | 5/2014 | Eleftheriadis et al. | 375/240.12 |
| 2002/0154691 | A1* | 10/2002 | Kost et al. | 375/240.01 |
| 2008/0267069 | A1* | 10/2008 | Thielman et al. | 370/235 |
| 2010/0019989 | A1* | 1/2010 | Odagawa et al. | 345/1.1 |
| 2010/0333004 | A1* | 12/2010 | Kristiansen et al. | 715/765 |

* cited by examiner

VIDEO COMMUNICATION METHOD AND SYSTEM FOR DYNAMICALLY MODIFYING VIDEO ENCODING

CROSS-REFERENCE TO RELATED APPLICATIONS

The present application is a continuation of International Application No. PCT/CN2011/083439, filed Dec. 5, 2011, and claims foreign priority to Chinese Application No. CN201110001383.0, filed Jan. 5, 2011, and which are incorporated herein by reference in their entireties.

FIELD OF THE INVENTION

The present invention relates to the field of video communication, and more particularly, to a video communication method for dynamically modifying video encoding and a video communication system of dynamically modifying video encoding.

BACKGROUND OF THE INVENTION

With the development of network communication technology, applications of making video communication between communication terminals are more and more common.

In traditional video communication, when size of a video window in a local receiver is changed (e.g., scaled by a user), the receiver, according to the video quality statistics in a certain time, informs the video source encoder on the sender side to modify the encoding rate, resolution, bit rate, frame rate and other parameters via real time transport protocol (RTCP), to eventually adapt to the changes of the video window size. Therefore, even if the video window size of the receiver is changed, the video source encoder on the sender side remains in the same encoding strategy for a certain time.

The traditional video communication technology notifies the encoder on the sender side to make change completely basing on the statistical results of recent video quality. A certain response time is required for the sender to fully adapt the scaling operation of video window size on the receiver side. Therefore, the efficiency is low. Especially, when a large window is scaled to a small window, a long response time and a wide bandwidth is needed, which thereby impacts the ability of other video channels to effectively use the bandwidth resources and the CPU resources. When a small window is scaled to a large window, the video quality on the receiver side is affected since the sender will remain the small encoding resolution.

SUMMARY OF THE INVENTION

Accordingly, it is necessary to provide a video communication method for dynamically modifying video encoding being able to quickly respond to the change of video window size.

A video communication method for dynamically modifying video encoding includes: obtaining a video window size change signal from a video receiver; generating an encoding modification signal according to the change signal; transmitting the encoding modification signal to a video sender; and the video sender receiving the encoding modification signal and modifying encoder's encoding parameters according to the encoding modification signal.

Preferably, the encoding modification signal is a modifying signal.

Preferably, the encoder's encoding parameters include one or one more of the following: encoding rate, bit rate, resolution and frame rate; the modifying signal includes one or one more of the following that need to be modified: encoding rate, bit rate, resolution and frame rate.

Preferably, the video communication method further includes: making statistics on video quality on the video receiver side; informing the video sender via real time transport control protocol to modify the encoder's encoding parameters according to the statistics in a first predetermined time.

Preferably, the video communication method further includes: the video sender encoding video according to the modified encoding parameters and transmitting the encoded video to the video receiver.

Preferably, in the step of transmitting the encoding modification signal to a video sender, the encoding modification signal is transmitted using a transmission control protocol.

According to a second aspect thereof, the present invention further provides a video communication method of dynamically modifying video encoding, wherein the method includes: obtaining a video window size change signal from a video receiver; generating an encoding modification signal according to the change signal; transmitting the encoding modification signal to a video sender; and receiving the video encoded with encoder's encoding parameters that are modified by the video sender in real time according to the encoding modification signal.

Preferably, the encoding modification signal is a modifying signal.

Preferably, the video communication method further includes: making statistics on video quality on the video receiver side; informing the video sender via real time transport control protocol to modify the encoder's encoding parameters according to the statistics in a first predetermined time.

Preferably, in the step of transmitting the encoding modification signal to a video sender, the encoding modification signal is transmitted via transmission control protocol.

According to a third aspect thereof, the present invention further provides a video communication method for dynamically modifying video encoding, wherein the method includes: a video sender receiving an encoding modification signal generated by a video receiver according to video window size change, modifying encoder's encoding parameters in real time according the encoding change signal; encoding video according the modified encoding parameters; and transmitting the encoded video to the video receiver.

Preferably, the encoder's encoding parameters include one or one more of the following: encoding rate, bit rate, resolution and frame rate; the encoding modification signal is a modifying signal including one or one more of the following that need to be modified: encoding rate, bit rate, resolution and frame rate.

It is necessary to further provide a video communication system for dynamically modifying video encoding for quickly responding to the change of the video window size.

A video communication system for dynamically modifying video encoding includes a video receiver and a video sender. The video receiver includes an input module, a signal generating module and a transmitting interface that are sequentially connected; the input module is used for obtaining a video window size change signal from the video receiver; the signal generating module is used for generating an encoding modification signal according to the change signal; and the transmitting interface is used for transmitting the encoding modification signal to the vide sender. The video sender includes a receiving interface and an encoder that are interconnected. The receiving interface is used for receiving the encoding modification signal, and the encoder is used for modifying encoding parameters in real time according to the encoding modification signal.

Preferably, the encoder's encoding parameters include one or one more of the following: encoding rate, bit rate, resolution and frame rate; the encoding modification signal is a modifying signal including one or one more of the following that need to be modified: encoding rate, bit rate, resolution and frame rate.

Preferably, the video receiver further includes a video quality statistics module connected to the transmitting interface for making statistics on video quality on the video receiver side; the transmitting interface is also used for informing the video sender via real time transport control protocol to modify the encoder's encoding parameters according the statistics in a first predetermined time.

Preferably, the video sender is used for encoding video by the modified encoding parameters and transmitting the encoded video to the video receiver.

According to a fifth aspect thereof, the present invention provides a video receiver, wherein the video receiver includes: an input module used for obtaining a video window size change signal from a video receiver side; a signal generating module used for generating an encoding modification signal according to the change signal; a transmitting interface used for transmitting the encoding modification signal to a vide sender; a video receiving module used for receiving the video encoded with encoder's encoding parameters that are modified by the video sender in real time according to the encoding modification signal.

Preferably, the encoding modification signal is a modifying signal.

Preferably, the video receiver further includes a video quality statistics module connected to the transmitting interface for making statistics on video quality on the video receiver side; the transmitting interface is also used for informing the video sender via a real time transport control protocol for modifying the encoder's encoding parameters according to the statistics in a first predetermined time.

Preferably, the transmitting interface is used for transmitting the encoding modification signal to the video sender via transmission control protocol.

According to sixth aspect thereof, a video sender includes: a receiving interface used for receiving encoding modification signal generated by a video receiver according to a video window size change signal; an encoder used for modifying encoding parameters in real time according to the encoding modification signal and encoding video by the modified encoding parameters; a video sender module for sending the encoded video to the video receiver; and a video transmitting module for transmitting the encoded video to the video receiver.

Preferably, the encoding parameters include one or one more of the following: encoding rate, bit rate, resolution and frame rate; the encoding modification signal is a modifying signal including one or one more of the following that need to be modified: encoding rate, bit rate, resolution and frame rate.

According to the video communication method for dynamically modifying video encoding and the video communication system for dynamically modifying video encoding described above, when the video window size on the video receiver side changes, the video receiver immediately sends a signal to the video sender for informing the video sender to modify the encoder's encoding parameters. The video sender timely modifies the encoder's encoding parameters according to the signal. Therefore, the bandwidth and CPU resources can be used in a more quick, reasonable and efficient manner.

DESCRIPTION OF THE PREFERRED EMBODIMENTS

Figure 1:
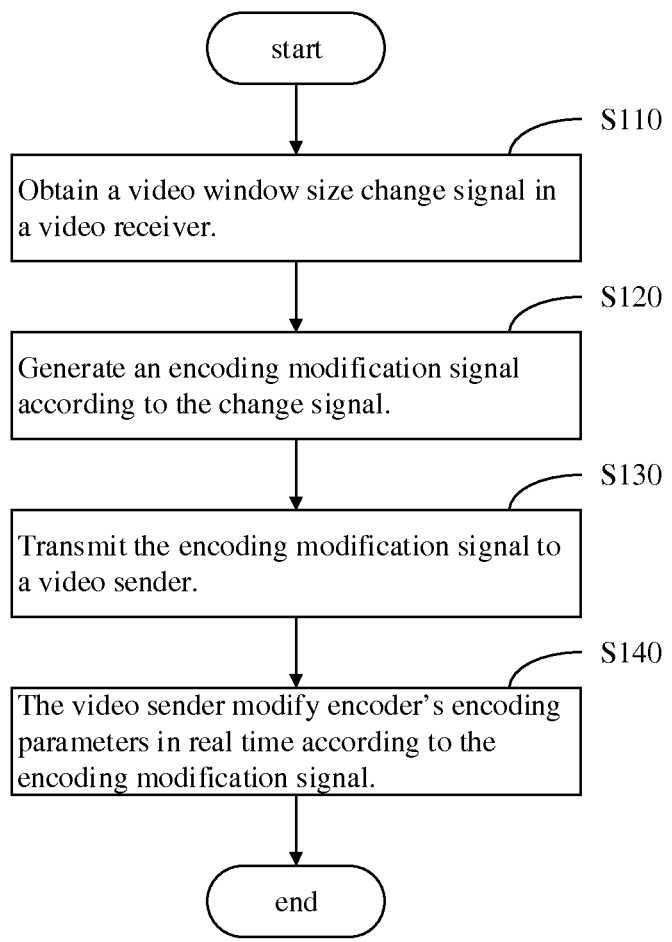
FIG. 1 is a flowchart of a video communication method for dynamically modifying video encoding according to an embodiment of the present invention.

In order to make the objects, features and advantages of the present disclosure clearer, the following examples are intended to illustratively be described referring to the drawings.

The present invention is based on the conventional QoS (Quality of Service) guarantee of the real-time video stream. Encoding modification is generated when video window size in a video receiver is changed, which enables a video sender to respond to the changes in the video receiver in real time. The present invention is applicable to multi-channel (including duplex channel) video communication.

FIG. 1 is a flowchart of a video communication method for dynamically modifying video encoding according to an embodiment of the present invention. The method includes the following steps.

S110, obtain a video window size change signal in a video receiver. In this step, the video window size change signal is obtained when video window size in the video receiver is changed.

S120, generate an encoding modification signal according to the change signal. The encoding modification signal is a customized signal. For example, the encoding modification signal could be a modifying signal (MODIFY_CAP). The encoding modification signal contains one or one more of the encoding parameters: encoding rate, bit rate, resolution, frame rate, etc.

S130, transmit the encoding modification signal to a video sender.

In the present embodiment, the transmission of the signals between the video sender and the video receiver is transmitted by TCP (Transmission control protocol). In other embodiments, the signals could be transmitted by other reliable transmission protocol. In the present embodiment, the signal and the video data is transmitted in the same channel. In other embodiments, the signal and the video data could be transmitted in different channels.

S140, the video sender receives the encoding modification signal and modifies an encoder's encoding parameters in real time according to the encoding modification signal. The encoding parameters include at least one of following: encoding rate, bit rate, resolution and frame rate.

When the encoding parameter is modified, the video sender encodes the video based on the modified encoding parameters and transmits the encoded video to the receiver.

In another embodiment, the video communication method for dynamically modifying video encoding further includes the following steps.

Make statistics on the video quality of the video receiver.

According to the statistics of the video quality within a certain period of time, notify the video sender by real time transport control protocol (RTCP) to modify the encoding rate, resolution, bit rate, frame rate of video source encoder. The certain period of time is a first predetermined time, which could be an empirical value.

Figure 2:
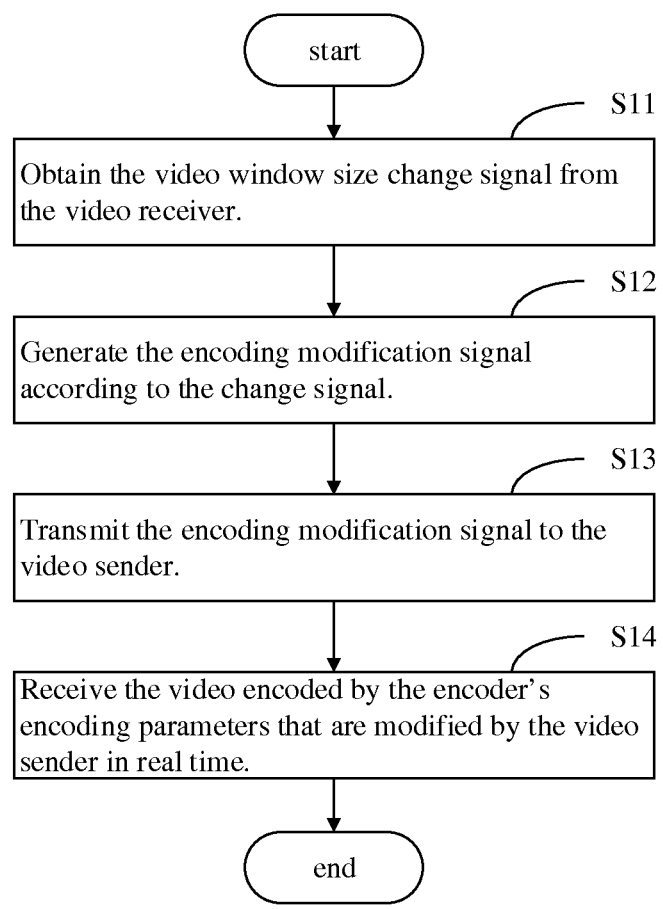
FIG. 2 is a working flowchart of a video receiver according to the embodiment of the present invention.

The operation of the video receiver is illustrated in FIG. 2.

S11, obtain the video window size change signal from the video receiver.

S12, generate the encoding modification signal according to the change signal. In the present embodiment, the encoding modification signal is a customized signal. For example, the encoding modification signal could be a modifying signal (MODIFY_CAP). The encoding modification signal contains one or one more of the encoding parameters: encoding rate, bit rate, resolution, frame rate, etc.

S13, transmit the encoding modification signal to the video sender. In the present embodiment, the signal between the sender and the receiver is transmitted by TCP (transmission control protocol).

S14, receive the video encoded by the encoder's encoding parameters that are modified by the video sender in real time.

The operation of the video receiver could further comprise the following steps:

Make statistics for the video quality of the video receiver.

According to the statistics of the video quality within a certain period of time, notify the video sender by real time transport control protocol (RTCP) to modify the encoding rate, resolution, bit rate, frame rate of video source encoder. The certain period of time is a first predetermined time, which could be an empirical value.

Figure 3:
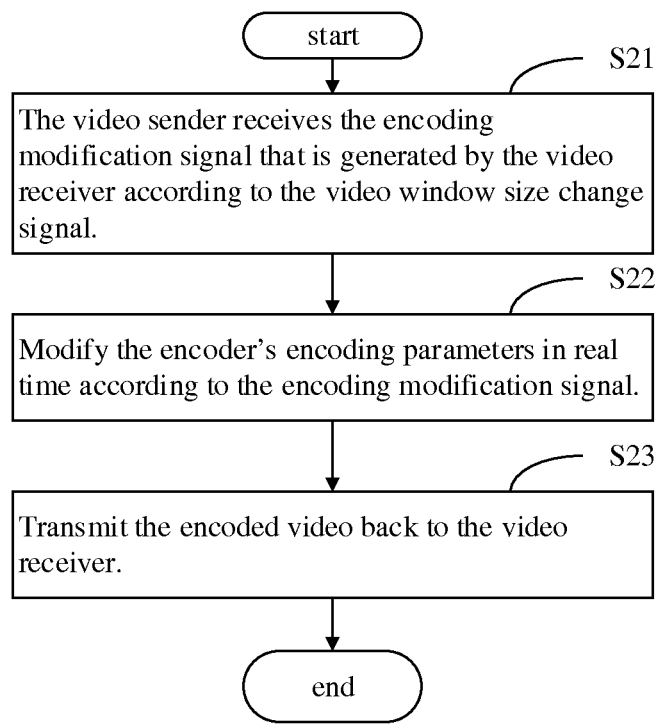
FIG. 3 is a working flowchart of a video sender according to the embodiment of the present invention.

The operation of the video sender is illustrated in FIG. 3.

S21, the video sender receives the encoding modification signal that is generated by the video receiver according to the video window size change signal. In the present embodiment, the encoding modification signal is a modifying signal containing one of one more of the following: encoding rate, bit rate, resolution and frame rate.

S22, modify the encoder's encoding parameters in real time according to the encoding modification signal. In the present embodiment, the encoding parameters include at least one of follows: encoding rate, bit rate, resolution and frame rate.

S23, transmit the encoded video back to the video receiver.

A specific embodiment is described below to introduce the steps of the video communication method for dynamically modifying video encoding.

Step A, establish a video session.

The parties involved in the video communication establish a multi-people video session by a session establishment protocol.

Step B, exchange video process capacities to each other.

In the initial stage of establishing the session, the video process capacities are exchanged by an exchanging signal (EXCHANGE_CAP). The video process capacities include the decoding capacities of the terminal hardware of each party that involved in the session, such as video resolution, bit rate, frame rate, etc. When the capacities are exchanged, every party involved in the session acknowledges the capacities of the other parties involved in the session.

Step C, encode the video and transmit the encoded video data. When the video session is established, each party involved in the session adapts to a set of encoding parameters according to the capacity of the counterparty, and encodes the video data by the adapted encoding parameters, and transmits the encoded video data to the counterparty.

Step D, receive and decode the encoded video data.

During the session, i.e., during the step C and step D, video window size may be changed because of user's operation or other reason. The change of video window size on the video receiver side means that the decoding capacities of the video receiver are changed. Then the operation flow goes to step S110 to obtain the video window size change signal from the video receiver.

S120, generate an encoding modification signal according to the change signal. The encoding modification signal is a modifying signal (MODIFY_CAP), containing the latest decoding capacity of the video receiver in the current state.

S130, transmit the encoding modification signal to the video sender. Once generated, the encoding modification signal is transmitted to the video sender. In the present embodiment, the encoding modification signal and the video data in the aforesaid step C are transmitted in the same channel. In other embodiments, the encoding modification signal and the video data could be transmitted in different channels, respectively.

S140, the video sender receives the encoding modification signal, and modifies the encoding parameters in real time according to the encoding modification signal. On the reception of the encoding modification signal, according to the parameters contained in the encoding modification signal, the sender timely and dynamically changes the encoding policy (the encoding parameters) of the encoder for the video (the video targeted for the video receiver that transmits the encoding modification signal).

Therefore, once the encoding policy of the video is updated, the video receiver will know the modification of the video encoding. The received video data is a video data stream that matches the current video process capacity.

Furthermore, in the present embodiment, when the video session is established, each party involved in the video communication will periodically inform the other parties about its communication environment via RTCP signal. The communication environment may include the current network bandwidth, delay and encoding requirement. Each party that receives the RTCP signal may accordingly modify its own encoding strategy (modifies encoding parameters) based on the parameters in the RTCP signal, to adapt to changes in the communication environment. In traditional communication, this adaption process is slow, especially in conditions of frequent changes. The slow process results in a waste of resources. However, in the present invention, by the use of the modifying signal, it is able to adapt to the changes in a timelier manner. Therefore, the bandwidth and CPU resources can be allocated and used in a more quick, reasonable and efficient manner; and the overall quality of multiplayer real-time video communication is improved.

Figure 4:
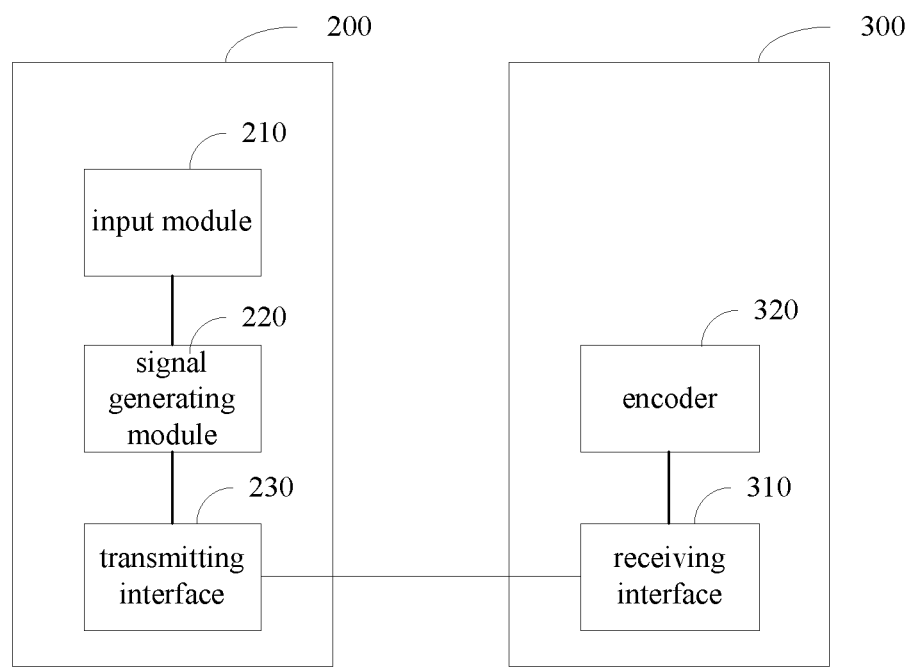
FIG. 4 is a block diagram of a video communication system for dynamically modifying video encoding according to the embodiment of the present invention.

FIG. 4 illustrates a video communication system for dynamically modifying video encoding according to an embodiment of the present invention. The video communication system includes a video receiver 200 and a video sender 300.

The video receiver 200 includes an input module 210, a signal generating module 220 and a transmitting interface 230 that are sequentially connected. The input module 210 is used for obtaining the video window size change signal from the video receiver 200. The signal generating module 220 generates the encoding modification signal according to the video window size change signal. The transmitting interface 230 is used for transmitting the encoding modification signal to the video sender 300.

In the present embodiment, the transmitting interface 230 transmits the encoding modification signal to the video sender 300 via TCP (Transmission control protocol). In other embodiments, the signal may be transmitted via other protocol. In the present embodiment, the encoding modification signal and the video data are transmitted in the same channel. In other embodiment, the encoding modification signal and the video data could be transmitted in different channels.

The video sender 300 includes a receiving interface 310 and an encoder 320 that are interconnected. The receiving interface 310 is used for receiving the encoding modification signal transmitted from the transmitting interface 230. The encoder 320 modifies encoding parameters in real time according to the encoding modification signal.

The video sender 300 is also used for encoding the video data according the modified encoding parameters, and transmitting the encoded video data to the video receiver 200.

In the present embodiment, the encoding modification signal is a customized signal. For example, the encoding modification signal could be a modifying signal (MODIFY_CAP). The encoding modification signal contains one or one more of the following: encoding rate, bit rate, resolution, frame rate, etc.

Figure 5:
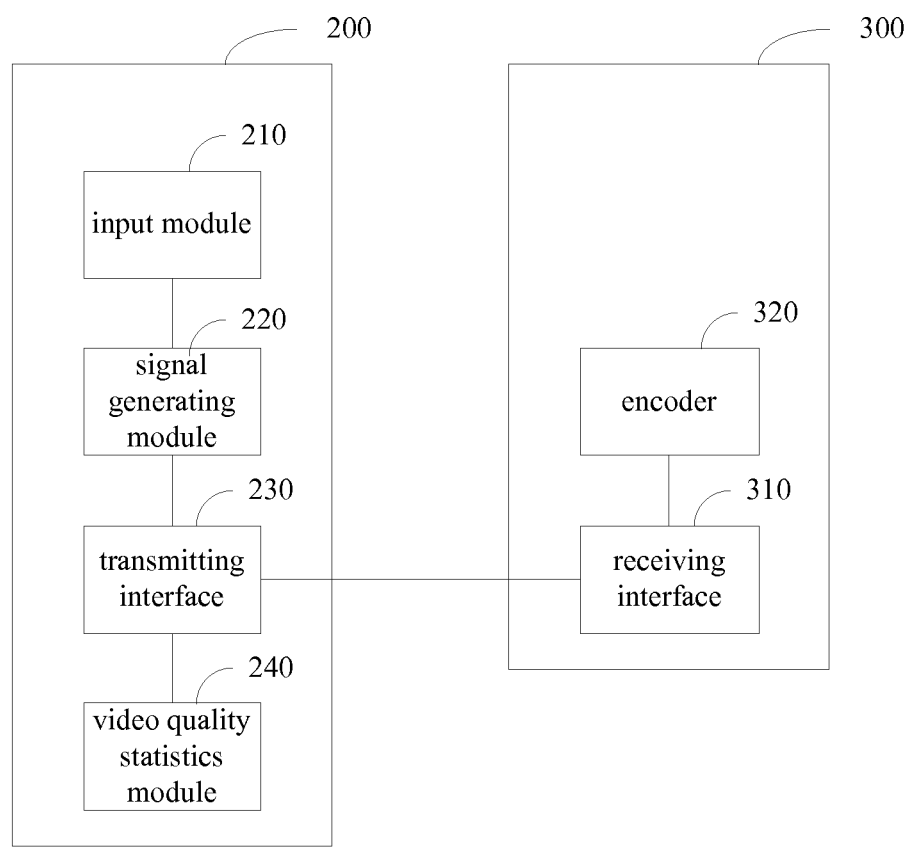
FIG. 5 is a block diagram of a video communication system for dynamically modifying video encoding according to another embodiment of the present invention.

FIG. 5 illustrates a video communication system for dynamically modifying video encoding according to another embodiment of the present invention. The video communication system of FIG. 5 is different from the video communication system of FIG. 4 mainly in that, the video communication of FIG. 5 further includes a video quality statistics module 240. The video quality statistics module 240 is used for video quality statistics of the video receiver 200. The transmitting interface 230 is further used for informing the video sender 300 via RTCP to modify the encoding parameters of the encoder 320 according the video quality statistics in a first predetermined time.

Figure 6:
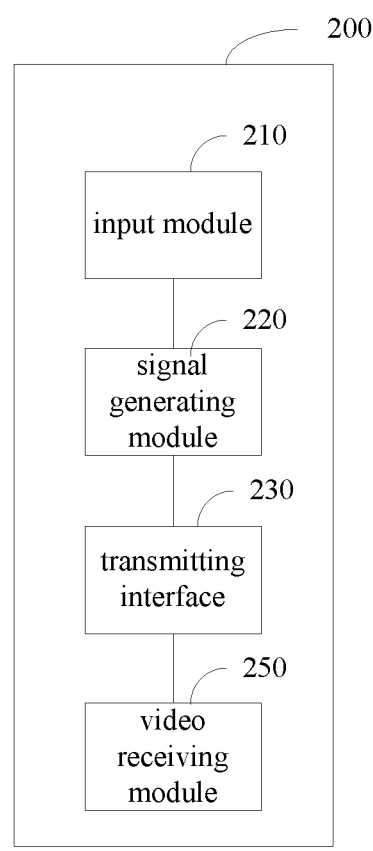
FIG. 6 is a block diagram of a video receiver according to the embodiment of the present invention.

FIG. 6 illustrates a video receiver according to an embodiment of the present invention. The video receiver 200 includes an input module 210, a signal generating module 220, a transmitting interface 230 and a video receiving module 250.

The input module 210 is used to obtain video window size change signal from the video receiver 200.

The signal generating module 220 is used to generate an encoding modification signal according to the change signal. In the present embodiment, the encoding modification signal is a customized signal. For example, the encoding modification signal could be a modifying signal (MODIFY_CAP), containing one or one more of the following parameters that need to be modified: encoding rate, bit rate, resolution and frame rate.

The transmitting interface 230 is used for transmitting the encoding modification signal to the video sender 300.

The video receiving module 250 is used for receiving the video that is encoded by the video sender 300 with the encoding parameters that are modified in real time according to the encoding modification signal.

As described above, in preferred embodiments, the video receiver 200 may also include a video quality statistics module 240 for video quality statistics of the video receiver 200. In the embodiment, the transmitting interface 230 is further used for informing the video sender 300 to modify the encoding parameters of the encoder 320 via RTCP according the video quality statistics in a first predetermined time.

Figure 7:
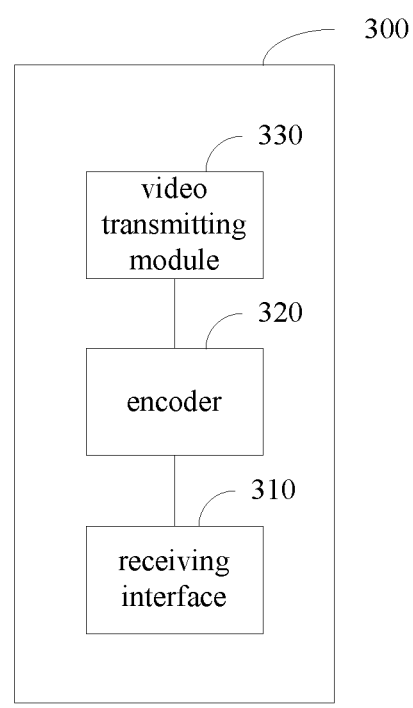
FIG. 7 is a block diagram of a video sender according to the embodiment of the present invention.

FIG. 7 illustrates a video sender according to an embodiment of the present invention. The video sender 300 includes:

the receiving interface 310 which is used for receiving the encoding modification signal that is generated by the video receiver 200 according to the video window size change signal;

the encoder 320 which is used for modifying encoding parameters in real time according to the encoding modification signal; in the present embodiment, the encoding parameters of the encoder 320 include one or one more of the following: encoding rate, bit rate, resolution, frame rate, etc;

the video transmitting module 330 which is used for transmitting the encoded video to the video receiver 200.

According to the video communication method for dynamically modifying video encoding and the video communication system for dynamically modifying video encoding described above, when the video window size of the video receiver changes, the video receiver immediately sends a signal to the video sender and inform the video sender to modify the encoder's encoding parameters. The video sender modifies the encoder's encoding parameters according to the signal. At the same time, the video sender adaptively modifies the bandwidth requirement and CPU requirement of each channel according to the RTCP feedback. Therefore, the net bandwidth and CPU resources could be timely, reasonably, and effectively used.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A video communication method for dynamically modifying video encoding, the method comprising:

obtaining, by a video receiver, a video window size change signal generated in the video receiver and indicating a changing of a video window size of a video being received by the video receiver;

generating, by the video receiver, an encoding modification signal according to the change signal, the encoding modification signal indicating that at least one of an encoding rate, a bit rate, a resolution and a frame rate of an encoder of a video sender sending the video that is being received by the video receiver, needs to be modified;

transmitting, by the video receiver, the encoding modification signal to the video sender in a same channel in which the video sender sends the video that is being received by the video receiver;

receiving, by the video sender, the encoding modification signal; and modifying, by the video sender, said at least one of the encoding rate, the bit rate, the resolution and the frame rate of the encoder according to the encoding modification signal received by the video sender.

2. The video communication method according to claim 1, wherein the video communication method further comprises:

making statistics for video quality of the video receiver; and informing the video sender to modify said at least one of the encoding rate, the bit rate, the resolution and the frame rate of the encoder via real time transport control protocol according to the statistics in a first predetermined time.

3. The video communication method according to claim 1, wherein the video communication method further comprises:
encoding, by the video sender, video according to the modified said at least one of the encoding rate, the bit rate, the resolution and the frame rate of the encoder; and
transmitting, by the video sender, the encoded video to the video receiver.

4. The video communication method according to claim 1, wherein, in said transmitting the encoding modification signal to a video sender, the encoding modification signal is transmitted via transmission control protocol.

5. A video communication method for dynamically modifying video encoding, the method comprising:
obtaining, by a video receiver, a video window size change signal generated in the video receiver and indicating a changing of a video window size of a video being received by the video receiver;
generating, by the video receiver, an encoding modification signal according to the change signal, the encoding modification signal indicating that at least one of an encoding rate, a bit rate, a resolution and a frame rate of an encoder of a video sender sending the video that is being received by the video receiver, needs to be modified;
transmitting, by the video receiver, the encoding modification signal to the video sender in a same channel in which the video sender sends the video that is being received by the video receiver; and
receiving, by the video receiver, the video encoded with said at least one of the encoding rate, the bit rate, the resolution and the frame rate of the encoder having been modified by the video sender in real time according to the encoding modification signal transmitted to the video sender.

6. The video communication method according to claim 5, wherein the video communication method further comprises:
making statistics for video quality of the video receiver; and
informing the video sender via real time transport control protocol to modify the at least one of the encoding rate, the bit rate, the resolution and the frame rate of the encoder according to the statistics in a first predetermined time.

7. The video communication method according to claim 5, wherein, in said transmitting the encoding modification signal to a video sender, the encoding modification signal is transmitted via transmission control protocol.

8. A video communication method for dynamically modifying video encoding, the method comprising:
receiving, by a video sender sending a video that is being received by a video receiver, an encoding modification signal generated by the video receiver according to a video window size change of the video being received by the video receiver and transmitted to the video sender by the video receiver in a same channel in which the video sender sends the video that is being received by the video receiver, the encoding modification signal indicating that at least one of an encoding rate, a bit rate, a resolution and a frame rate of an encoder of the video sender that needs to be modified;
modifying, by the video sender, said at least one of the encoding rate, the bit rate, the resolution and the frame rate of the encoder in real time according the encoding modification signal;
encoding video according the modified said at least one of the encoding rate, the bit rate, the resolution and the frame rate of the encoder; and
transmitting the encoded video to the video receiver.

9. A video communication system of dynamically modifying video encoding, comprising:
a video receiver that receives a video; and
a video sender including an encoder and that transmits the video that is received by the video receiver, wherein:
the video receiver comprises an input module, a signal generating module and a transmitting interface that are sequentially connected, the input module being used to obtain a video window size change signal indicating a changing of a video window size of the video received by the video receiver, the signal generating module being used to generate an encoding modification signal according to the change signal, the encoding modification signal indicating that at least one of an encoding rate, a bit rate, a resolution and a frame rate of the encoder needs to be modified, the transmitting interface being used to transmit the encoding modification signal to the video sender in a same channel in which the video sender sends the video that is received by the video receiver; and
the video sender comprises a receiving interface being used to receive the encoding modification signal, the video sender modifying said at least one of the encoding rate, the bit rate, the resolution and the frame rate of the encoder in real time according to the encoding modification signal received by the receiving interface.

10. The video communication system according to claim 9, wherein:
the video receiver further comprises a video quality statistics module connected to the transmitting interface for making statistics of video quality of the video receiver; and
the transmitting interface is also used for informing the video sender via real time transport control protocol to modify said at least one of the encoding rate, the bit rate, the resolution and the frame rate of the encoder according the statistics in a first predetermined time.

11. The video communication system according to claim 9, wherein:
the video sender is used to encode the video by the modified said at least one of the encoding rate, the bit rate, the resolution and the frame rate of the encoder and to transmit the encoded video to the video receiver.

12. A video receiver comprising:
an input module to obtain a video window size change signal of the video receiver indicating a changing of a video window size of a video being received by the video receiver;
a signal generating module to generate an encoding modification signal according to the change signal, the encoding modification signal indicating that at least one of an encoding rate, a bit rate, a resolution and a frame rate of an encoder of a video sender sending the video that is being received by the video receiver, needs to be modified;
a transmitting interface to transmit the encoding modification signal to the video sender in a same channel in which the video sender sends the video that is being received by the video receiver; and a video receiving module to receive video encoded with said at least one of the encoding rate, the bit rate, the resolution and the frame rate of the encoder having been modified by the video sender in real time according to the encoding modification signal.

13. The video receiver according to claim 12, wherein:

the video receiver further comprises a video quality statistics module connected to the transmitting interface for making statistics of video quality of the video receiver; and the transmitting interface is also used to inform the video sender via real time transport control protocol to modify said at least one of the encoding rate, the bit rate, the resolution and the frame rate of the encoder according the statistics in a first predetermined time.

14. The video receiver according to claim 12, wherein the transmitting interface is used to transmit the encoding modification signal to the video sender via transmission control protocol.

15. A video sender that sends a video to a video receiver, the video sender comprising:

a receiving interface to receive an encoding modification signal generated by the video receiver according to a video window size change signal indicating a changing of a video window size of the video in the video receiver and transmitted to the video sender in a same channel in which the video sender sends the video to the video receiver, the encoding modification signal indicating that at least one of an encoding rate, a bit rate, a resolution and a frame rate of an encoder of the video sender needs to be modified;

an encoder to modify said at least one of the encoding rate, the bit rate, the resolution and the frame rate of the encoder in real time according to the encoding modification signal, and to encode the video with the modified said at least one of the encoding rate, the bit rate, the resolution and the frame rate of the encoder; and a video transmitting module to transmit the encoded video to the video receiver.

\* \* \* \* \*